June 17, 1969
G. EISENMAN
3,450,604
METHOD FOR MEASURING SODIUM ION
Filed Nov. 19, 1959
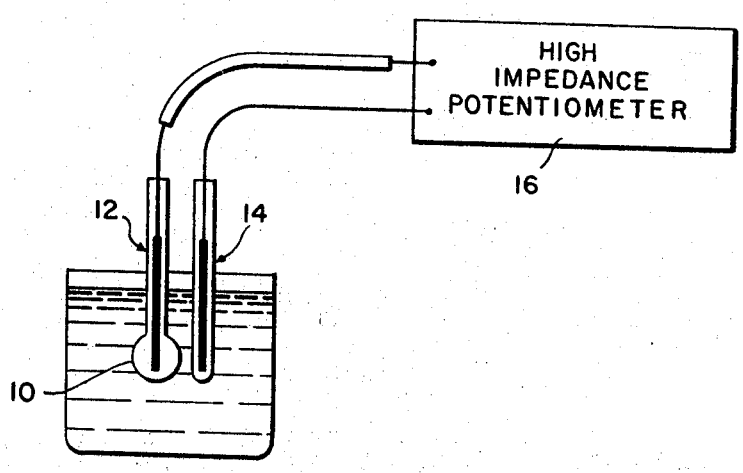
INVENTORS.
DONALD O. RUDIN
BY GEORGE EISENMAN
JAMES U. CASBY
Max R. Millman
ATTORNEY.

United States Patent Office 3,450,604
Patented June 17, 1969

3,450,604
METHOD FOR MEASURING SODIUM ION
George Eisenman, Gladwyne, Pa., assignor, by mesne assignments, to Corning Glass Works, a corporation of New York
Filed Nov. 19, 1959, Ser. No. 854,153
Int. Cl. B01k 3/02
U.S. Cl. 204—1        1 Claims

ABSTRACT OF THE DISCLOSURE

A process of selectively measuring sodium ion activity in an aqueous solution using a glass electrode whose membrane composition consists essentially of lithia, alumina and silica, the ratio of mole percent of alumina to lithia being at least substantially 1:3.

---

This invention relates to cation sensitive glass electrodes for selectively measuring $Na^+$ activity in the presence of $K^+$ and other cations over a wide range of pH and constitutes an improvement over our Patent No. 2,829,090.

In said patent I disclose that a glass electrode whose active portion is made of a soda-alumina-silica glass composition in which the ratio of the mole percent of $Al_2O_3$ to $Na_2O$ is at least substantially 1:1 is a useful electrode for selectively measuring $Na^+$ activity because such a glass is at least 100 times as sensitive to $Na^+$ as to $K^+$ and for practical purposes insensitive to H at neutral and alkaline pH.

The glasses of the present invention possess at least the same or better sodium to potassium sensitivity and also possess properties which offer advantages in the fabrication of the membrane or bulb and its fusion to the stem not present in some of the sodium sensitive glasses of said Patent No. 2,829,090.

For example, sodium-sensitive lithium alumino silicate glasses have different thermal expansion properties and lower softening temperatures than soda-alumina-silica glasses of corresponding function and sometimes composition. Thus, a lithium alumino silicate glass containing 10.4 mole percent $Li_2O$, 22.6 mole percent $Al_2O_3$, remainder $SiO_2$, offers better glass fabrication properties for the making of glass electrodes than any of the sodium selective soda-alumina-silica glasses.

The glass compositions of the present invention consist of lithium oxide, alumina and a network or glass forming oxide consisting of silicon or germanium dioxide in which the ratio of the mole percent of $Al_2O_3$ to that of $Li_2O$ is at least substantially 1:3, that is the mole percent of $Li_2O$ never exceeds 3 times the mole percent of $Al_2O_3$ as determined by chemical analysis of the fused glass. All such glasses are at least 100 times as sensitive to $Na^+$ as to $K^+$. Thus, the range of useful sodium selective compositions is broadened for lithium glasses as compared to sodium glasses, since, as is evident from Patent No. 2,829,090, the ratio of the mole percent of $Al_2O_3$ to $Na_2O$ must be at least equal to 1 for $Na_2O$ containing glasses.

For example, an $Li_2O$—$Al_2O_3$—$SiO_2$ composition containing 18 mole percent $Li_2O$ and 4.2 mole percent $Al_2O_3$ (LAS 18–4.2) has potential sodium selectivity properties corresponding to a $Na_2O$—$Al_2O_3$—$SiO_2$ glass containing 18 mole percent $Na_2O$ and 14 mole percent $Al_2O_3$ (NAS 18–14). Similarly, a lithium alumino silicate glass of composition LAS 19.1–5.4 has potential selectivity properties corresponding to a sodium alumino silicate glass of composition NAS 19.1–14. The aforementioned lithium alumino silicates and their corresponding sodium alumino silicates are less than 100 times as sensitive to $Na^+$ as to $K^+$, the criterion stated hereinabove. However, an easily workable $Li_2O$—$Al_2O_3$—$SiO_2$ glass of composition LAS 10.4–22.6 has potential selectivity properties corresponding to an NAS glass which cannot be practically made and which is more than 10,000 times as sensitive to $Na^+$ as to $K^+$ over much of the pH range. This glass is 4 times as sensitive to $H^+$ as to $Na^+$, 110 times more sensitive to $Na^+$ as to $Li^+$, and at least 10,000 times more sensitive to $Na^+$ as to $K^+$, $Rb^+$ or $Cs^+$.

It should be understood that the property of high sodium selectivity relative to potassium is a function only of $Al_2O_3$: $Li_2O$ (or $Na_2O$) ratio in the final fused glass. Hence, the network forming oxide $SiO_2$ may be partially or totally replaced by $GeO_2$ and oxides such as MgO, CaO, SrO, BaO, CuO, $Fe_2O_3$ and $B_2O_3$ can be added up to several mole percent as can also even other alkali metal oxides in small amounts to improve the physical properties of the glass without importantly affecting the sodium to potassium or hydrogen selectivity of the electrode.

The glass electrode of the instant invention is employed in conventional pH equipment which is shown diagrammatically in FIGURE 1. It is the active portion (bulb or membrane) 10 of the conventional electrode 12 which is made of the aforedescribed glass compositions. The electrode is operatively connected to a standard half-cell 14, such as saturated KCl-calomel via conventional high impedance, high gain electrometric amplification equipment 16. The instrument may be calibrated with known solutions containing mixtures of $H^+$, $Na^+$ and $K^+$ cations and the $Na^+$ ion concentration of unknown solutions can then be measured directly by subjecting the glass and reference electrode to the unknown solutions in the manner set forth in patent No. 2,829,090. The electrodes are indifferent to the particular anion present, such as chloride, hydroxyl, bicarbonate, nitrate, acetate, carbonate, sulphate, thiosulphate, ferrocyanide and ferricyanide. Nor are they affected by the presence of oxidizing or reducing substances. They are also relatively insensitive to divalent and more highly charged cations as well as $NH_4^+$, $N(CH_3)_4^+$, and $N(C_2H_5)_4^+$ except when these are present in unusual quantities.

I claim:

1. A process of selectively measuring sodium ion activity in an aqueous solution, comprising providing an electrode whose active portion is made of a composition consisting essentially of about 10.4 mole percent lithium oxide, about 22.6 mole percent aluminum oxide and the remainder silica, said electrode being at least 100 times as sensitive to $Na^+$ as to $K^+$, subjecting the solution to said glass electrode and to a standard reference half-cell and operatively connecting the glass electrode and reference half-cell to a high impedance electrometric amplifier.

References Cited

UNITED STATES PATENTS

| 2,462,843 | 3/1949 | Carry et al. | 204—195.1 |
| 2,829,090 | 4/1958 | Eisenman et al. | 204—195.1 |

OTHER REFERENCES

Tendeloo et al., "Recueil des Travaux des Pays Bas," vol. 61, (1942).

Eisenman et al. (B), "Science," vol. 126, Oct. 25, 1957, pp. 831–834.

JOHN H. MACK, *Primary Examiner.*

T. TUNG, *Assistant Examiner.*

U.S. Cl. X.R.

106—52; 204—195